(12) United States Patent
Yamashita

(10) Patent No.: US 11,981,260 B2
(45) Date of Patent: May 14, 2024

(54) VEHICLE WARNING DEVICE

(71) Applicant: TOYOTA JIDOSHA KABUSHIKI KAISHA, Toyota (JP)

(72) Inventor: Takaya Yamashita, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 15 days.

(21) Appl. No.: 18/080,266

(22) Filed: Dec. 13, 2022

(65) Prior Publication Data

US 2023/0256904 A1 Aug. 17, 2023

(30) Foreign Application Priority Data

Feb. 16, 2022 (JP) .................. 2022-021785

(51) Int. Cl.
*B60Q 9/00* (2006.01)
*B60R 1/12* (2006.01)

(52) U.S. Cl.
CPC ............ B60Q 9/008 (2013.01); B60R 1/1207 (2013.01)

(58) Field of Classification Search
None
See application file for complete search history.

(56) References Cited

U.S. PATENT DOCUMENTS

| | | | | |
|---|---|---|---|---|
| 7,551,103 B2* | 6/2009 | Schofield | ............... | H04N 23/90 340/937 |
| 9,776,565 B2* | 10/2017 | Lee | .................. | B60Q 9/008 |
| 2004/0042638 A1* | 3/2004 | Iwano | .................. | G06T 7/12 348/148 |
| 2015/0070194 A1* | 3/2015 | Jo | .................. | G08G 1/167 340/905 |
| 2015/0287324 A1* | 10/2015 | Schwindt | ............... | G08G 1/167 340/435 |
| 2017/0028915 A1* | 2/2017 | Lee | .................. | G06V 20/58 |
| 2018/0201192 A1* | 7/2018 | Ishida | .................. | G08G 1/0962 |
| 2018/0346027 A1* | 12/2018 | Fujii | .................. | B60K 35/28 |
| 2019/0172356 A1* | 6/2019 | Sim | .................. | G08G 1/167 |
| 2023/0144727 A1* | 5/2023 | Kim | .................. | G01S 13/931 340/435 |

FOREIGN PATENT DOCUMENTS

| | | |
|---|---|---|
| JP | 2002-372584 A | 12/2002 |
| JP | 2003-291689 A | 10/2003 |
| JP | 2018-116516 A | 7/2018 |
| JP | 2020-121575 A | 8/2020 |

\* cited by examiner

Primary Examiner — Muhammad Adnan
(74) Attorney, Agent, or Firm — Sughrue Mion, PLLC

(57) ABSTRACT

A vehicle warning device causes a buzzer to generate a warning sound and vibrates a steering wheel using a steering vibration actuator when a monitoring target object for a right monitor range is present with a right turn signal changed from off to on, that is, generates a warning. The vehicle warning device does not generate the warning even though the monitoring target object for the right monitor range is present when any of cases where a lane change by one lane from an original lane to a first right adjacent lane is completed during an on state of the right turn signal, a distance between a right side surface of the host vehicle and a right lane marking of the first right adjacent lane is a threshold distance or less, and a time to enter a second right adjacent lane is a threshold time or less does not occur.

7 Claims, 12 Drawing Sheets

VEHICLE WARNING DEVICE

CROSS-REFERENCE TO RELATED APPLICATION

This application claims priority to Japanese Patent Application No. 2022-021785 filed on Feb. 16, 2022, incorporated herein by reference in its entirety.

BACKGROUND

1. Technical Field

The present disclosure relates to a vehicle warning device that generates warning to a driver of a vehicle when an object that the driver should pay attention to is determined to be present laterally at the rear of the vehicle.

2. Description of Related Art

Conventionally, a vehicle surrounding monitoring device called a blind spot monitor has been known (see, for example, Japanese Unexamined Patent Application Publication No. 2003-291689 (JP 2003-291689 A)). A blind spot monitor is hereinafter denoted as "BSM". A vehicle equipped with the BSM is herein referred to as a "host vehicle" for convenience.

As shown in FIG. 10, the BSM turns on an indicator installed in a right side mirror of a host vehicle HV when another vehicle OV1 is positioned within a predetermined right monitor range RA on the right rear side of the host vehicle HV and another vehicle that is predicted to enter the right monitor range RA within a threshold entry time is present. The right monitor range RA includes, for example, a blind spot area that is not reflected in the right side mirror of the host vehicle HV. Similarly, the BSM turns on an indicator installed in a left side mirror of the host vehicle HV when another vehicle is positioned within a predetermined left monitor range LA on the left rear side of the host vehicle HV and another vehicle OV2 that is predicted to enter the left monitor range LA within the threshold entry time is present. The left monitor range LA includes, for example, a blind spot area that is not reflected in the left side mirror of the host vehicle HV (for example, see Japanese Unexamined Patent Application Publication No. 2020-121575 (JP 2020-121575 A) and Japanese Unexamined Patent Application Publication No. 2018-116516 (JP 2018-116516 A)). Hereinafter, the right monitor range RA and the left monitor range LA will be referred to as a "monitoring range" when there is no need to distinguish the right monitor range RA and the left monitor range LA from each other. Other vehicles that are present within the monitoring range and other vehicles that are predicted to enter the monitoring range within the threshold entry time will be referred to as "monitoring target objects" when there is no need to distinguish the other vehicles from each other.

SUMMARY

As shown in FIG. 11, generally, the driver of the host vehicle HV changes lanes while blinking a turn signal in a specific direction (the right direction in the example of FIG. 11) that is one of the right direction and the left direction. In this case, when there is the monitoring target object (for example, another vehicle OV3) with respect to the monitoring range in the specific direction (the right monitor range RA in the example of FIG. 11), it is preferable to urge the driver to more reliably recognize that the monitoring target object is present. Therefore, in such a case, the inventor has been studying, for example, generation of a warning, such as a warning sound generated from a warning generating device Bz and vibration of a steering wheel, in addition to a change of the state of the indicator installed in the side mirror from the lighting state to the blinking state.

However, as will be described below, it has been found that the driver may find the warning annoying.

That is, as shown in FIG. 12A, when the driver of the host vehicle HV changes lanes to the right, first, the driver starts blinking of the right (specific direction) turn signal. Next, the driver changes lanes by one lane from a first lane (original lane) L1 to a second lane (first right adjacent lane) L2 while keeping the right turn signal blinking. In the example shown in FIG. 12A, when the host vehicle HV is positioned in the first lane L1, there is no monitoring target object with respect to the monitoring range in the specific direction (that is, the right monitoring range RA), and thus the above warning is not performed.

After a certain period of time, as shown in FIG. 12B, the host vehicle HV completes the lane change from the first lane L1 to the second lane L2. Immediately after this lane change, the right turn signal continues to blink. However, the driver of the host vehicle HV does not intend to change lanes from the second lane L2 to a third lane L3 (second right adjacent lane), and intends to travel in the second lane L2.

However, since the right turn signal is blinking, the warning is performed when the monitoring target object (for example, another vehicle OV4) is present with respect to the monitoring range (that is, the right monitoring range RA) on the side in the specific direction. As a result, the driver who does not intend to change lanes from the second lane L2 to the third lane L3 finds this warning annoying.

The present disclosure has been made to solve the above-mentioned issue. The present disclosure provides a vehicle warning device capable of reducing a possibility of performing a warning that the driver of the host vehicle feels annoying while performing an effective warning to the driver when the host vehicle changes lanes with the turn signal blinking.

In order to achieve the above object, one aspect of the present disclosure is a vehicle warning device including: a sensor (10, 30) configured to acquire information of an object laterally at a rear of a vehicle (host vehicle HV); a camera (51) that captures an area in front of the vehicle and generates image data of the area in front of the vehicle; a warning generating device (20, 40, 61, 62) configured to be able to generate a warning to a driver of the vehicle; and a control unit (12, 32, 52, 60) that causes the warning generating device to generate the warning (step 540, step 940) when the control unit determines that a warning target object is present (step 530: Yes, step 930: Yes) in a case where the control unit acquires turn signal information that is information on an operating state of a turn signal in a left direction of the vehicle and a turn signal in a right direction of the vehicle and determines that the turn signal in a specific direction being any one of the left direction and the right direction is blinking based on the turn signal information (step 510: Yes, step 910: Yes), the warning target object including at least one of a first object that is positioned in a predetermined area behind the vehicle in the specific direction and a second object that is predicted to enter the predetermined area within a predetermined time.

The warning generating device is, for example, a sound generating device (61). In this case, the warning can be generated by causing the sound generating device to generate a warning sound.

The warning generating device is, for example, a steering vibration actuator (62) that is able to vibrate a steering wheel of the vehicle. In this case, the warning can be generated by vibrating the steering wheel using the steering vibration actuator.

Further, the warning generating device is, for example, an indicator (20, 40) installed in a side mirror of the vehicle. In this case, the warning can be generated by blinking the indicator.

Further, the control unit is configured to, when the control unit determines that a specific state occurs based on the turn signal information and the image data (step 520: Yes, step 920: Yes), the specific state being a state in which blinking of the turn signal in the specific direction continues after the vehicle completes a lane change by one lane from a first lane to a second lane adjacent to the first lane in the specific direction while the turn signal in the specific direction is blinking, determine whether a warning permission condition including at least one of a first condition satisfied when a distance between a lane marking that separates a third lane adjacent to the second lane in the specific direction from the second lane and a side surface of the vehicle in the specific direction is equal to or less than a threshold distance (step 550, step 950) and a second condition satisfied when a time until the side surface of the vehicle in the specific direction starts to enter the third lane is equal to or less than a threshold time (step 560, step 960) is satisfied based on the image data, and is configured not to cause the warning generating device to generate the warning ("No" in step 550, step 560, "No" in step 950, step 960) when the warning permission condition is determined not to be satisfied even though the warning target object is determined to be present.

According to this aspect, when the specific state occurs and the warning permission condition including at least one of the first condition and the second condition is not satisfied, the warning is not generated even though the warning target object is determined to be present.

Therefore, when the driver of the vehicle intends to change lanes by one lane from the original lane (that is, the first lane) while blinking the turn signal and travel in the lane after the lane change (that is, the second lane), the warning is not generated even though the warning target object is determined to be present in the lane (that is, the third lane) adjacent to the lane after the lane change. Therefore, it is possible to reduce the possibility that the warning that annoys the driver is generated.

On the other hand, when the vehicle changes lanes by one lane from the original lane (that is, the first lane) and then changes lanes by additional one lane (that is, from the second lane to the third lane) while the turn signal is blinking, it is highly likely that at least one of the first condition and the second condition is satisfied. Therefore, the vehicle warning device according to the aspect described above can generate an effective warning for the driver who changes lanes across two or more lanes.

According to one aspect of the disclosure, the control unit is configured to determine whether the first condition is satisfied when the control unit determines that the specific state occurs (step 550, step 950), and determine that the warning permission condition is not satisfied when the control unit determines that the first condition is not satisfied.

According to this aspect, in the case where the driver changes lanes across two or more lanes, the warning can be performed as necessary when the vehicle changes lanes by one lane, and further, approaches the lane adjacent to the lane after the lane change (that is, the third lane). With the above, an effective warning can be reliably generated even when a lane change over two or more lanes is performed. On the other hand, when the driver intends to change lanes by one lane, it is less likely that the vehicle approaches the lane (that is, the third lane) adjacent to the lane after the lane change (that is, the second lane). Therefore, it is possible to reduce the possibility that the warning that annoys the driver is generated.

Further, in this case, the control unit is configured to determine whether the second condition is satisfied when the control unit determines that the specific state occurs (step 560, step 960), determine that the warning permission condition is satisfied when the control unit determines that the second condition is satisfied even though the control unit determines that the first condition is not satisfied (that is, the first condition is not determined to be satisfied), and cause the warning generating device to generate the warning when the control unit determines that the warning target object is present in a case where the control unit determines that the warning permission condition is satisfied.

According to this aspect, when the driver performs the lane change across two or more lanes in a relatively short period of time, the second condition is satisfied when the lane change by one lane is performed and before the vehicle approaches the lane (that is, the third lane) adjacent to the lane after the lane change (that is, the second lane) (that is, before the first condition is satisfied). Therefore, when a lane change over two or more lanes is performed in a relatively short period of time, an effective warning can be reliably generated early. On the other hand, when the driver intends to change lanes by one lane, it is less likely that the second condition is satisfied. Therefore, it is possible to reduce the possibility that the warning that annoys the driver is generated.

According to one aspect of the disclosure, the control unit is configured to acquire a lane width of a road on which the vehicle is traveling, and change the threshold time such that the threshold time becomes shorter as the lane width becomes narrower.

According to this aspect, even when the lane widths are different, it is possible to accurately determine whether the driver intends to change lanes across two or more lanes at an earlier timing. Note that, the lane width may be acquired based on the image data, or may be acquired by acquiring the current traveling position in the lane and acquiring the lane width information for the road corresponding to the traveling position from a storage device or via communication.

In the above description, the symbols used in the embodiment are bracketed for the component requirements of the disclosure corresponding to the embodiment to help understanding of the disclosure. However, the component requirements of the disclosure are not limited to the embodiment specified by the above symbols.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a plan view of a vehicle and surroundings of the vehicle showing a left rear side radar, a right rear side radar, a front camera, monitoring ranges (a right monitor range and a left monitor range), and the like;

DETAILED DESCRIPTION OF EMBODIMENTS

Configuration

A vehicle warning device 1 according to an embodiment of the present disclosure shown in FIG. 1 (hereinafter simply referred to as a "warning device 1") is mounted on a host vehicle HV shown in FIG. 2.

Figure 1:
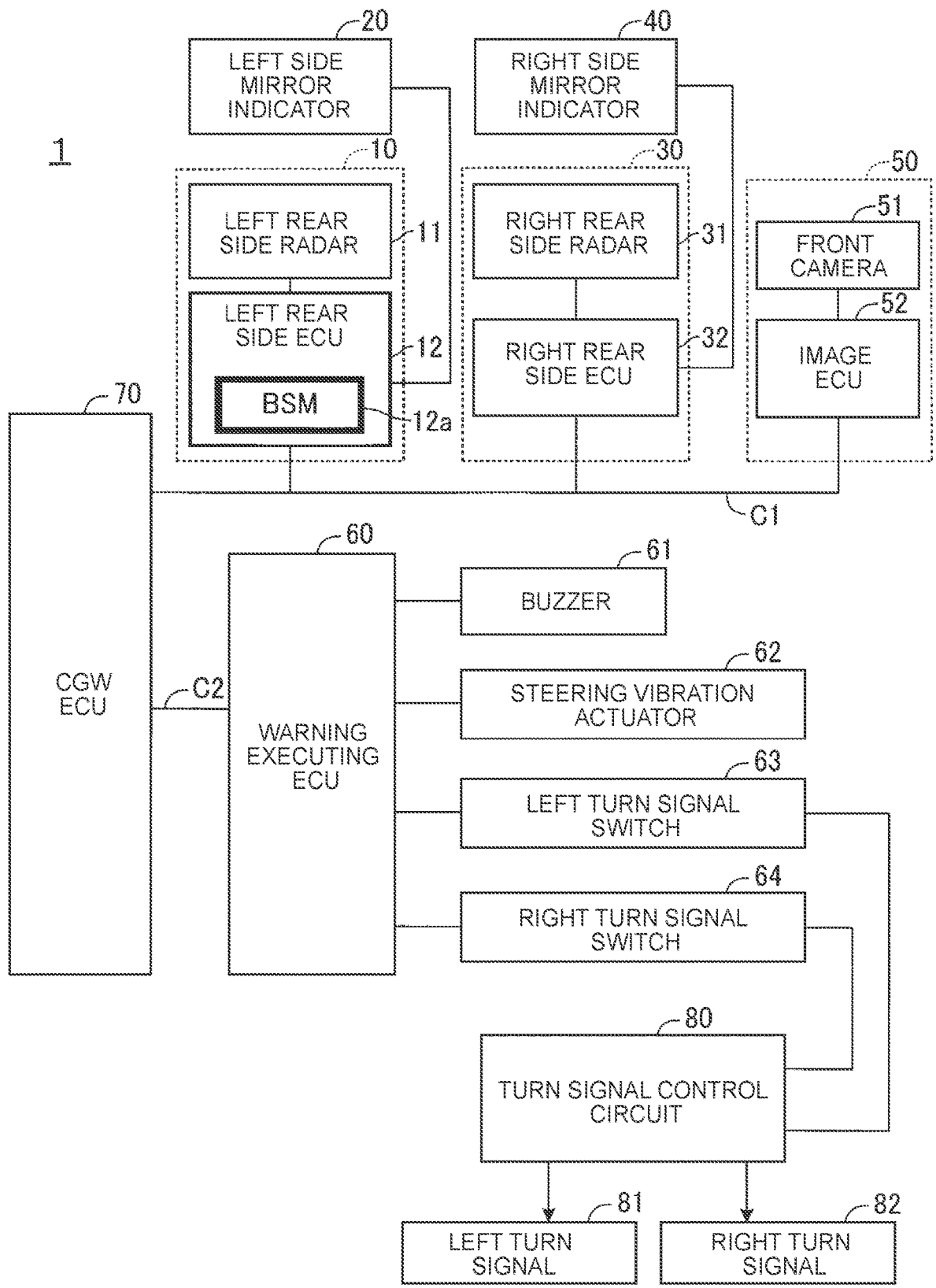
FIG. 1 is a schematic system configuration diagram of a vehicle warning device according to an embodiment of the present disclosure.

As shown in FIG. 1, the warning device 1 includes a left rear side radar device 10, a left side mirror indicator 20, a right rear side radar device 30, a right side mirror indicator 40, a front camera device 50, and a warning executing ECU 60, a buzzer 61, a steering vibration actuator 62, a left turn signal switch 63, a right turn signal switch 64, and a control gateway ECU 70.

The left side mirror indicator 20 will be hereinafter referred to as a "left mirror indicator 20". The right side mirror indicator 40 will be hereinafter referred to as a "right mirror indicator 40". Further, when there is no need to distinguish between the left mirror indicator 20 and the right mirror indicator 40, each of the left mirror indicator 20 and the right mirror indicator 40 may simply be referred to as a "mirror indicator." The control gateway ECU 70 will be referred to as a CGW-ECU 70.

The left rear side radar device 10 includes a left rear side radar 11 and a left rear side ECU 12.

In the present specification, the "ECU" stands for an electronic control unit including a microcomputer as its main unit, and is also referred to as a controller. The microcomputer includes a central processing unit (CPU), a read-only memory (ROM), a random access memory (RAM), a non-volatile memory, an interface (I/F), and the like. The CPU realizes various functions by executing instructions (programs, routines) stored in the ROM. Some or all of the left rear side ECU 12 and a plurality of ECUs to be described later may be integrated into one ECU.

Figure 2:
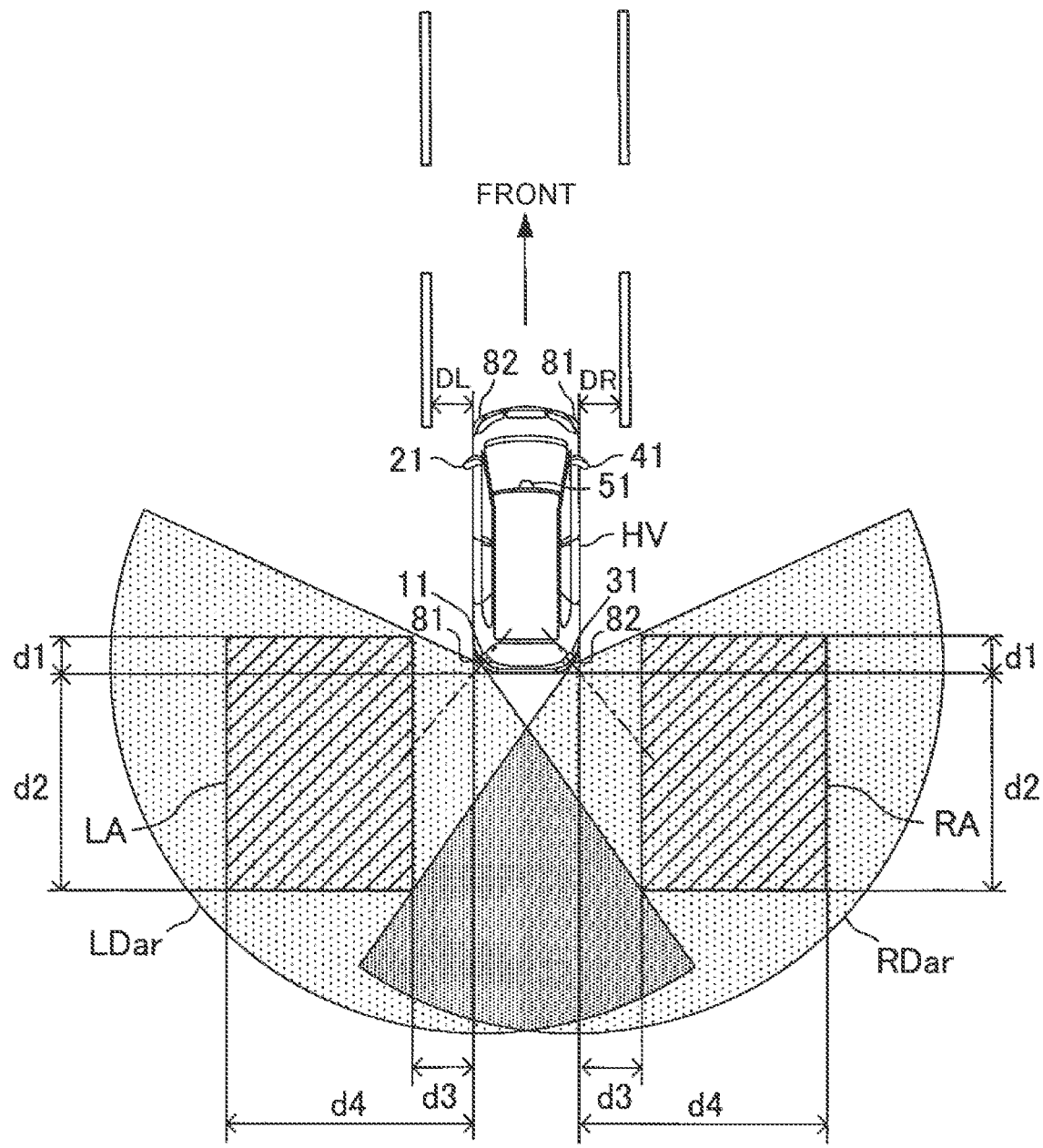

As shown in FIG. 2, the left rear side radar 11 is fixed to the left rear corner portion of the vehicle body of the host vehicle HV. The left rear side radar 11 transmits radio waves from the left rear corner portion of the vehicle body to "a detection range LDar having a predetermined horizontal angle with respect to a reference axis (radar axis) directed obliquely to the left rear of the vehicle body". This detection range LDar includes the left monitor range LA.

The left monitor range LA includes an area that the driver cannot visually recognize using the left side mirror 21 (that is, the left blind spot area). The left monitor range LA is a range between a perpendicular plane extending in a vehicle width direction at a position of a first distance d1 (for example, 1 meter (m)) forward from the rear end surface of the host vehicle HV and a perpendicular plane extending in the vehicle width direction at a position of a second distance d2 (for example, 3 m) rearward from the rear end surface of the host vehicle HV, and a range between a perpendicular plane extending leftward in a vehicle longitudinal direction at a position of a third distance d3 (for example, 0.5 m) from the left side surface of the host vehicle HV and a perpendicular plane extending leftward in the vehicle longitudinal direction at a position of a fourth distance d4 (for example, 3.5 m) from the left side surface of the host vehicle HV.

When an object is present within the detection range LDar of the left rear side radar 11, the object reflects the radio waves transmitted from the left rear side radar 11. As a result, reflected waves are formed. The left rear side radar 11 receives the reflected waves. The left rear side radar 11 transmits information on the transmitted radio waves and information on the received reflected waves to the left rear side ECU 12 every time a predetermined time elapses.

The left rear side ECU 12 acquires object information on an object present within the detection range LDar of the left rear side radar 11 based on the information transmitted from the left rear side radar 11. The object information is referred to as "left rear side object information", and includes the "a position (relative distance and relative direction), a relative speed, a width of the object, etc." of the object with respect to the left rear side radar 11. A function of generating such object information is also referred to as a surrounding object recognition function. When the width of the object is within a predetermined range (between a width WL and a width WH), the left rear side ECU 12 determines that the object is a vehicle (another vehicle).

The left rear side ECU 12 realizes a BSM function 12a to be described later, in addition to the surrounding object recognition function. BSM is an abbreviation for "blind spot monitor".

Figure 3:
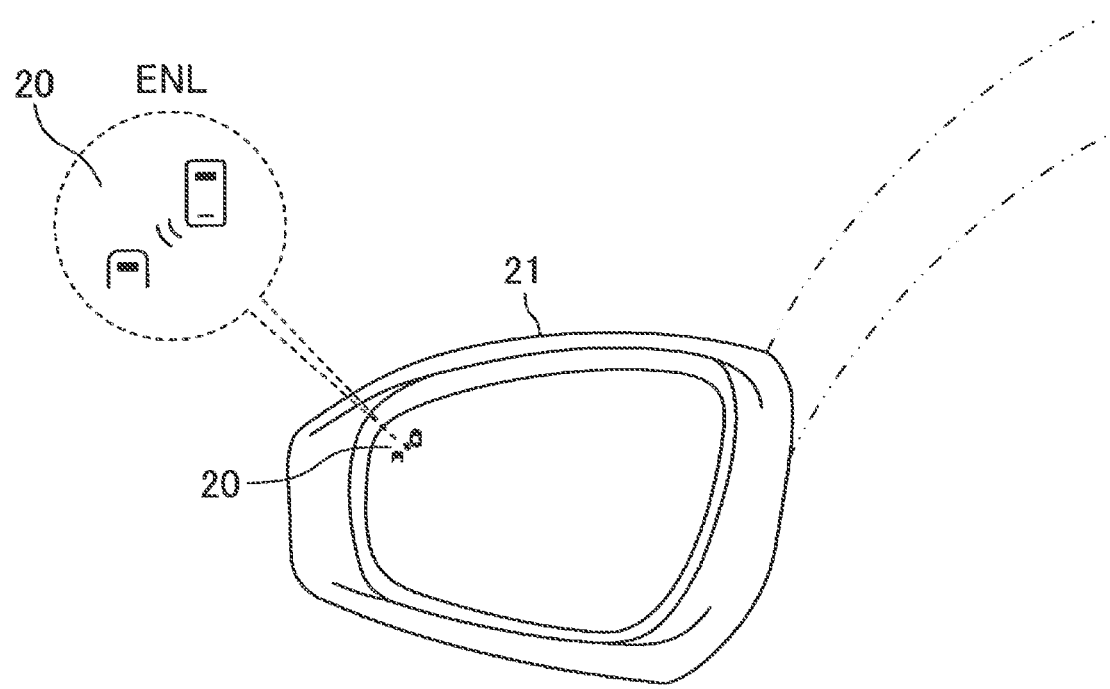
FIG. 3 is a front view of a left side mirror provided with an indicator.

As shown in FIG. 3, the left mirror indicator 20 is composed of a light emitting diode (LED) embedded in a part of the area where the mirror of the left side mirror 21 is provided. When this LED is lit, the driver can visually recognize the lit LED. Note that the lit left mirror indicator 20 is enlarged and displayed within a dashed circle ENL. The left mirror indicator 20 is lit or blinks in response to an instruction signal from the left rear side ECU 12.

The right rear side radar device 30 includes a right rear side radar 31 and a right rear side ECU 32, as shown in FIG. 1.

As shown in FIG. 2, the right rear side radar 31 is fixed to the right rear corner portion of the vehicle body of the host vehicle HV. The right rear side radar 31 transmits radio waves from the right rear corner portion of the vehicle body to "a detection range RDar having a predetermined horizontal angle with respect to a reference axis (radar axis) directed obliquely to the right rear of the vehicle body". This detection range RDar includes the right monitor range RA.

The "detection range LDar and detection range RDar" shown in FIG. 2 indicate the angles of the detection ranges of the left rear side radar 11 and the right rear side radar 31, respectively, but do not indicate the distances of the detection ranges of the left rear side radar 11 and the right rear side radar 31. The distance of each detection range is, for example, several tens of meters.

The right monitor range RA includes an area that the driver cannot visually recognize using the right side mirror 41 (that is, the right blind spot area). The right monitor range RA is a range between a perpendicular plane extending in the vehicle width direction at a position of the first distance d1 forward from the rear end surface of the host vehicle HV and a perpendicular plane extending in the vehicle width direction at a position of the second distance d2 rearward from the rear end surface of the host vehicle HV, and a range between a perpendicular plane extending rightward in the vehicle longitudinal direction at a position of the third distance d3 from the right side surface of the host vehicle HV and a perpendicular plane extending rightward in the vehicle longitudinal direction at a position of the fourth distance d4 from the right side surface of the host vehicle HV.

When an object is present within the detection range RDar of the right rear side radar 31, the object reflects the radio waves transmitted from the right rear side radar 31. As a result, reflected waves are formed. The right rear side radar 31 receives the reflected waves. The right rear side radar 31 transmits information on the transmitted radio waves and information on the received reflected waves to the right rear side ECU 32 every time a predetermined time elapses.

The right rear side ECU 32 acquires object information on an object present within the detection range RDar of the right rear side radar 31 based on the information transmitted from the right rear side radar 31. The object information is referred to as "right rear side object information", and includes the "a position (relative distance and relative direction), a relative speed, a width of the object, etc." of the object with respect to the right rear side radar 31. When the width of the object is within a predetermined range, the right rear side ECU 32 determines that the object is a vehicle (another vehicle). In this manner, the right rear side ECU 32 also has the surrounding object recognition function, similar to the left rear side ECU 12.

The right mirror indicator 40 shown in FIG. 1 has a configuration in which the left mirror indicator 20 is bilaterally symmetrical, and is composed of an LED embedded in a part of the area where the mirror of the right side mirror 41 is provided, as shown in FIG. 2. The right mirror indicator 40 is lit or blinks in response to an instruction signal from the right rear side ECU 32.

The left rear side ECU 12 and the right rear side ECU 32 are connected to each other via a local bus (not shown) so as to be able to transmit and receive information to and from each other such that a master-slave relationship is established. In this example, the left rear side ECU 12 is the master, and the right rear side ECU 32 is the slave.

The front camera device 50 includes a front camera 51 and an image ECU 52.

As shown in FIG. 2, the front camera 51 is disposed in an upper portion and at the center of the front windshield of the host vehicle HV. The front camera 51 acquires image data by capturing a scene (including a road surface and an object) in front of the host vehicle HV every time a predetermined time elapses.

The image ECU 52 analyzes image data transmitted from the front camera 51 and generates image information. The image information includes the following types of information:
  a median deviation distance that is a distance between the center of the front wheel axle of the host vehicle HV in the right-left direction and the center line (lane center line) of the lane in which the host vehicle HV is traveling (that is, the traveling lane);
  an angle (yaw angle) between the longitudinal axis direction of the host vehicle HV and the lane center line;
  a right margin distance DR (see FIG. 2) that is a distance between the right side surface of the host vehicle HV and a right lane marking (the left end of a right white line that is the right lane marking), where the right margin distance DR may be a distance between the right side surface of the host vehicle HV and the right end of the right white line that is the right lane marking of the traveling lane or the center line of the white line;
  a speed of the host vehicle HV in the lane width direction toward the right adjacent lane (a right lateral speed Rspd);
  a left margin distance DL (see FIG. 2) that is a distance between the left side surface of the host vehicle HV and a left lane marking (the right end of a left white line that is the left lane marking), where the left margin distance DL may be a distance between the left side surface of the host vehicle HV and the left end of the left white line that is the left lane marking of the traveling lane or the center line of the white line; and
  a speed of the host vehicle HV in the lane width direction toward the left adjacent lane (a left lateral speed Lspd).

The warning executing ECU 60 shown in FIG. 1 is connected to the buzzer 61, the steering vibration actuator 62, the left turn signal switch 63, and the right turn signal switch 64.

The buzzer 61 is a sound generating device (warning generating device) capable of generating a warning sound to the driver of the host vehicle HV in response to an instruction signal from the warning executing ECU 60.

The steering vibration actuator 62 is a warning generating device capable of vibrating the steering wheel (not shown) of the host vehicle HV in response to an instruction signal from the warning executing ECU 60 and issuing a vibrational warning to the driver of the host vehicle HV. The steering vibration actuator 62 may be an electric motor of an electric power steering device (not shown) and its drive circuit.

The left turn signal switch 63 outputs a high signal when a known turn signal lever provided on a steering column (not shown) is rotated leftward (counterclockwise) from a neutral position and maintained at a predetermined position in the left direction. The left turn signal switch 63 outputs a low signal when the turn signal lever is at a position other than the predetermined position in the left direction.

The right turn signal switch 64 outputs a high signal when the turn signal lever is rotated rightward (clockwise) from the neutral position and maintained at a predetermined position in the right direction. The right turn signal switch 64 outputs a low signal when the turn signal lever is at a position other than the predetermined position in the right direction. he high and low signals output from left turn signal switch 63 and right turn signal switch 64, respectively, are sometimes referred to as turn signal information.

As is well known, when the turn signal lever is rotated leftward by the driver while being maintained at the neutral position, the turn signal lever moves to the predetermined position in the left direction, and is maintained at the predetermined leftward position in the left direction even when the driver does not push the turn signal lever. The turn signal lever moves to the neutral position when the steering wheel is turned rightward by a predetermined angle while the turn signal lever is maintained at the predetermined position in the left direction. Similarly, when the turn signal lever is rotated rightward by the driver while being maintained at the neutral position, the turn signal lever moves to the predetermined position in the right direction, and is maintained at the predetermined position in the right direction even when the driver does not push the turn signal lever. The turn signal lever moves to the neutral position when the steering wheel is turned leftward by a predetermined angle while the turn signal lever is maintained at the predetermined position in the right direction.

The CGW-ECU 70 is an ECU that controls transmission and reception of information between a plurality of ECUs. The CGW-ECU 70 is connected to the left rear side ECU 12, the right rear side ECU 32, and the image ECU 52 via a first communication line C1, and is connected to the warning executing ECU 60 via a second communication line C2. Therefore, these ECUs can transmit and receive information to and from each other via the CGW-ECU 70, the first communication line C1 and the second communication line C2.

The left turn signal switch 63 and the right turn signal switch 64 are connected to a turn signal control circuit 80. The turn signal control circuit 80 is connected to a left turn signal (left blinker) 81 and a right turn signal (right blinker) 82. The turn signal control circuit 80 blinks the left turn signal 81 while receiving a high signal from the left turn signal switch 63. The turn signal control circuit 80 blinks the right turn signal 82 while receiving a high signal from the right turn signal switch 64.

Operation

The CPU of the left rear side ECU 12 (hereinafter simply referred to as the "CPU") executes the routines shown in the flowcharts of FIGS. 4, 5 and 9 every time a predetermined time elapses. With the above, the left rear side ECU 12 realizes the BSM function 12*a* (see FIG. 1).

BSM Control when Turn Signal is Off

Figure 4:
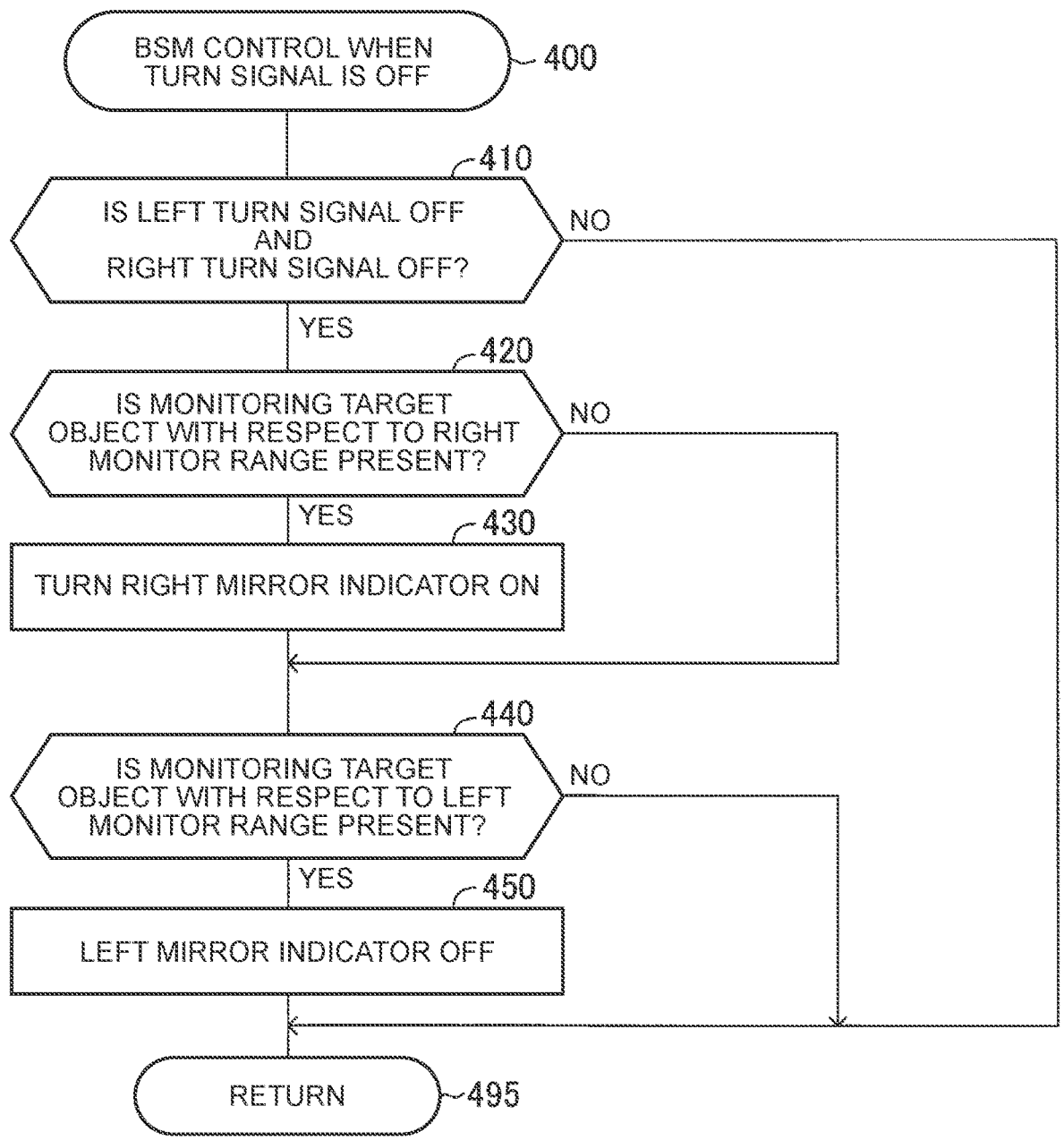
FIG. 4 is a flowchart showing a routine executed by a CPU of a left rear side ECU shown in FIG. 1.

Therefore, when an appropriate time comes, the CPU starts processing from step 400 in FIG. 4 and proceeds to step 410, and determines whether both the left turn signal 81 and the right turn signal 82 are off (in an unlit state). That is, the CPU determines whether the CPU receives the low signal from the left turn signal switch 63 and the low signal from the right turn signal switch 64.

When both the left turn signal 81 and the right turn signal 82 are off, the CPU determines "Yes" in step 410 and proceeds to step 420, and determines whether the monitoring target object with respect to the right monitor range RA is present based on the right rear side object information. That is, when the CPU determines that another vehicle (a part or the whole of the other vehicle) that is an object is positioned within the right monitor range RA (that is, when the first object is present), and/or when another vehicle (i.e., the second object) that is predicted to enter the right monitor range RA within the threshold entry time (TTCth) is present, the CPU determines that the monitoring target object with respect to the right monitor range RA is present. The CPU detects the object traveling toward the right monitor range RA from behind the host vehicle HV, and calculates time Ten until the object enters the right monitor range RA based on the relative speed of the object and the distance between the host vehicle HV and the object. Then, the CPU determines whether the second object is present in the right monitor range RA by determining whether the time Ten is shorter than the threshold entry time (TTCth). The method of determining whether the second object is present is also implemented in other steps for making similar determinations.

When the monitoring target object with respect to the right monitor range RA is present, the CPU determines "Yes" in step 420, proceeds to step 430, and turns on the right mirror indicator 40 (maintains the lighting state). Note that lighting of the right mirror indicator 40 does not correspond to the warning according to the present embodiment. The CPU then proceeds to step 440. On the other hand, when the monitoring target object with respect to the right monitor range RA is not present, the CPU determines "No" in step 420 and proceeds directly to step 440.

In step 440, the CPU determines whether the monitoring target object with respect to the left monitor range LA is present based on the left rear side object information. That is, when the CPU determines that another vehicle (a part or the whole of the other vehicle) is positioned within the left monitor range LA (that is, when the first object is present), and/or when another vehicle (that is, the second object) that is predicted to enter the left monitor range LA within the threshold entry time (TTCth) is present, the CPU determines that the monitoring target object with respect to the left monitor range LA is present. The CPU detects the object traveling toward the left monitor range LA from behind the host vehicle HV, and calculates the time Ten until the object enters the left monitor range LA based on the relative speed of the object and the distance between the host vehicle HV and the object. Then, the CPU determines whether the second object is present in the left monitor range LA by determining whether the time Ten is shorter than the threshold entry time (TTCth). The method of determining whether the second object is present is also implemented in other steps for making similar determinations.

When the monitoring target object with respect to the left monitor range LA is present, the CPU determines "Yes" in step 440, proceeds to step 450, and turns on the left mirror indicator 20 (maintains the lighting state). Note that lighting of the left mirror indicator 20 does not correspond to the warning according to the present embodiment. After that, the CPU proceeds to step 495 and temporarily terminates this routine. On the other hand, when the monitoring target object with respect to the left monitor range LA is not present, the CPU determines "No" in step 440, proceeds directly to step 495, and temporarily terminates this routine.

When any one of the left turn signal 81 and the right turn signal 82 is not turned off, the CPU determines "No" in step 410, proceeds directly to step 495, and temporarily terminates this routine.

As described above, when both the left turn signal 81 and the right turn signal 82 are off, the right mirror indicator 40 is lit when the monitoring target object with respect to the right monitor range RA is present. When the monitoring target object with respect to the left monitor range LA is present, the left mirror indicator 20 is lit. However, a warning using the buzzer 61 and the steering vibration actuator 62 is not generated. Furthermore, no warning is generated by blinking any of the right mirror indicator 40 and the left mirror indicator 20. That is, when both the left turn signal 81 and the right turn signal 82 are off, the CPU does not generate "warning" to call the driver's attention.

BSM Control when Right Turn Signal is on

Figure 5:
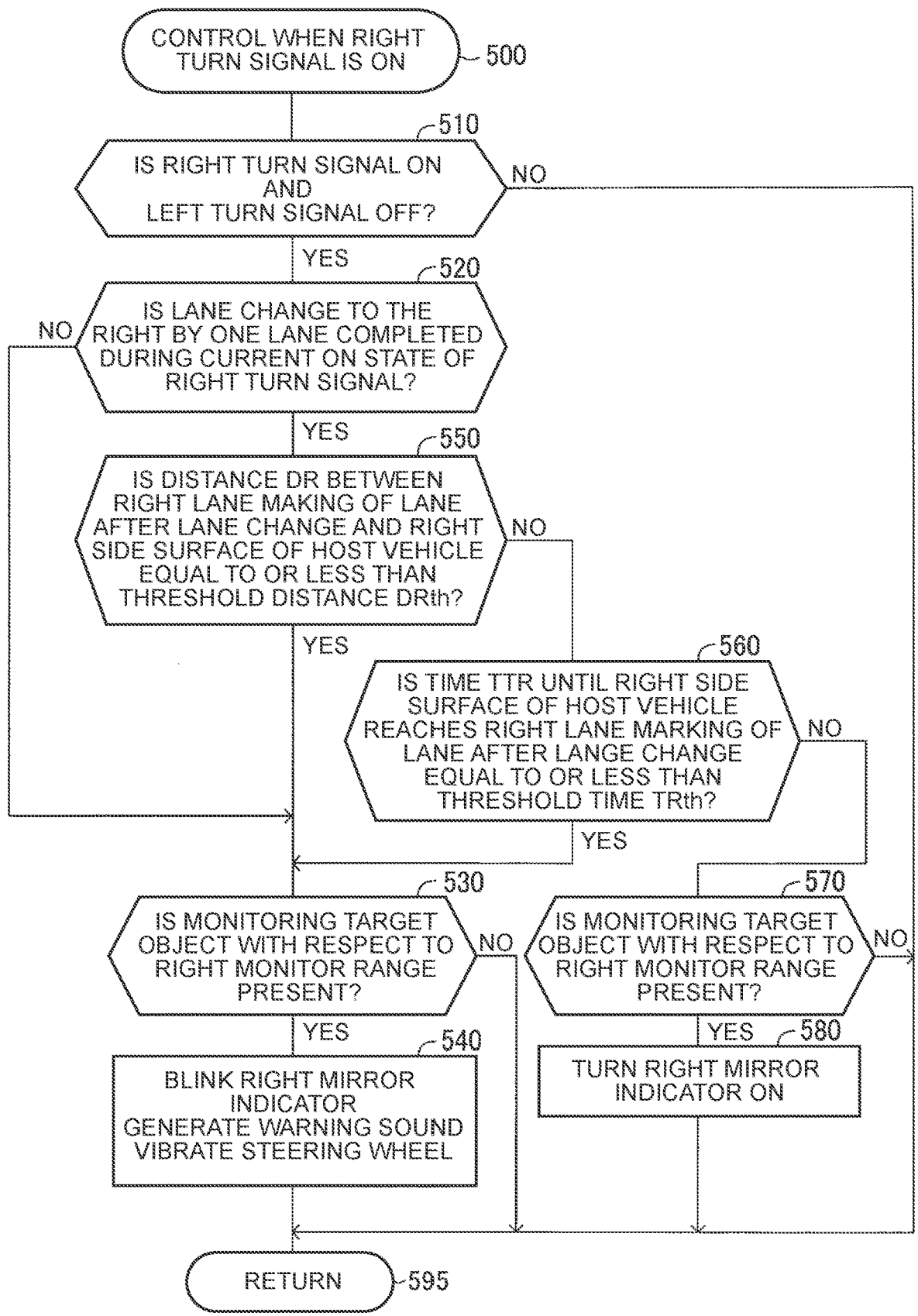
FIG. 5 is a flowchart showing a routine executed by the CPU of the left rear side ECU shown in FIG. 1.

When an appropriate time comes, the CPU starts processing from step 500 in FIG. 5 and proceeds to step 510, and determines whether the right turn signal 82 is on (that is, blinking) and the left turn signal 81 is off (in the unlit state). More specifically, the CPU determines whether the CPU receives the high signal from the right turn signal switch 64 and the low signal from the left turn signal switch 63.

When the determination condition in step 510 is not satisfied, the CPU determines "No" in step 510, proceeds to step 595, and temporarily ends this routine.

On the other hand, when the determination condition in step 510 is satisfied, the CPU determines "Yes" in step 510 and proceeds to step 520. In step 520, the CPU determines that the host vehicle HV completes lane change to the right by one lane from the original lane to the first right adjacent lane "while the right turn signal 82 is continuously maintained on after the right turn signal 82 is changed from off to on", based on the image information transmitted from the image ECU 52. The original lane is a lane in which the host vehicle HV is traveling before the lane change is started. The first right adjacent lane is a lane adjacent to the original lane in the right direction. "A period during which the right turn signal 82 is continuously maintained on after the right turn signal 82 is changed from off to on" is also referred to as a "specific period" in the right direction. The specific period in the right direction is a period during which the current on state (blinking state) of the right turn signal 82 is maintained.

Figure 6A:
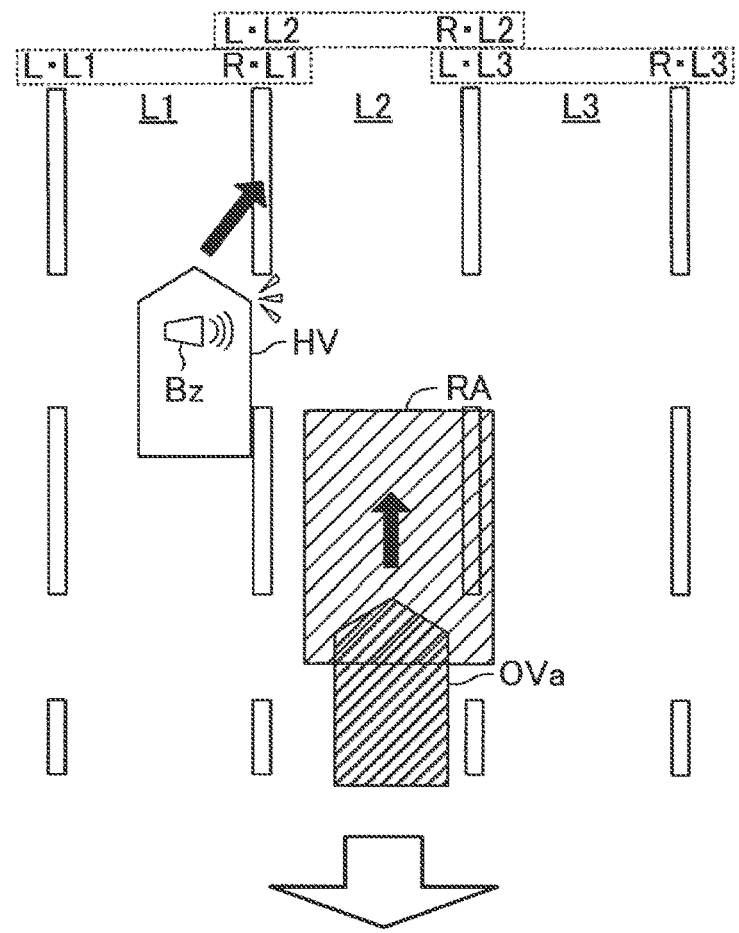
FIGS. 6A and 6B are plan views of a host vehicle and surroundings of the host vehicle showing a situation in which the host vehicle changes lanes.
Figure 6B:
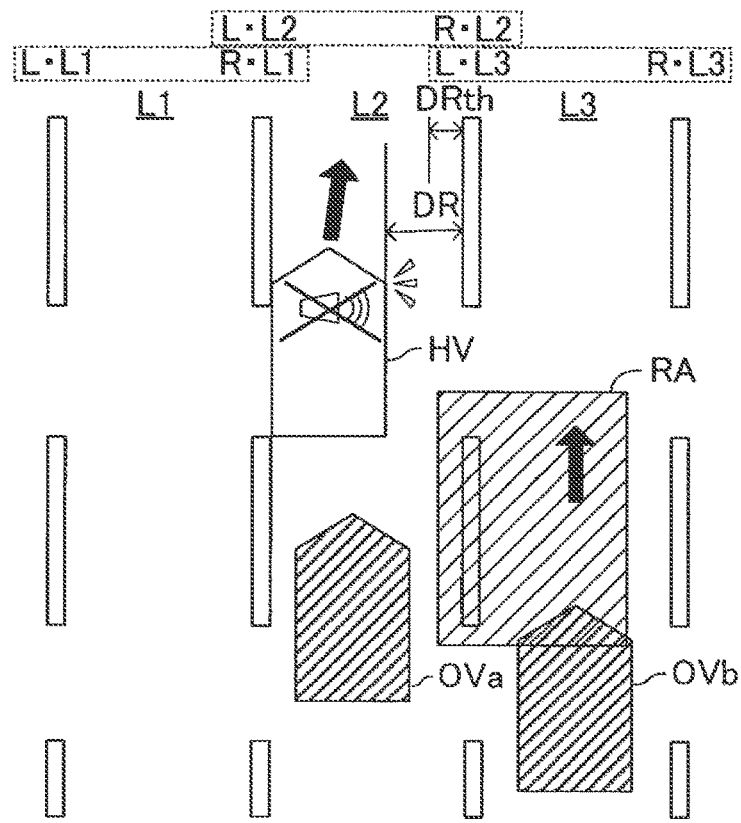

As shown in FIG. 6A, when the right turn signal 82 is in a blinking state, the CPU determines that the lane change to the right is started when the right side surface of the host vehicle HV is aligned with the left end of the right lane marking of the original lane (for example, a right lane marking R·L1 of the first lane L1). As shown in FIG. 6B, when the right turn signal 82 is in a blinking state, the CPU determines that the lane change to the right by one lane is completed when the left side surface of the host vehicle HV is aligned with the left lane marking of the first right adjacent lane (for example, a left lane marking L·L2 of the second lane L2 that is adjacent to the first lane L1 on the right side) after the lane change to the right is determined to be started. Note that the left lane marking L·L2 of the second lane L2 is the same lane marking as the right lane marking R·L1 of the first lane L1.

On assumption that the host vehicle HV has not completed the lane change to the right by one lane, the CPU determines "No" in step 520 in FIG. 5 and proceeds to step 530. In step 530, as in step 420, the CPU determines whether the monitoring target object with respect to the right monitor range RA (that is, any of the first object and the second object) is present based on the right rear side object information.

When the monitoring target object with respect to the right monitor range RA is present, the CPU determines "Yes" in step 530 and proceeds to step 540 to generate a warning as described below.

The right mirror indicator 40 is set to a blinking state.
The buzzer 61 is caused to generate a warning sound.
The steering vibration actuator 62 is used to vibrate the steering wheel.

After that, the CPU proceeds to step 595 and temporarily terminates this routine.

On the other hand, when the monitoring target object with respect to the right monitor range RA is not present, the CPU determines "No" in step 530, proceeds directly to step 595, and temporarily terminates this routine.

Therefore, as shown in FIG. 6A, the warning is generated when another vehicle OVa that is the monitoring target object with respect to the right monitor range RA is present during a period after the right turn signal 82 changes to the blinking state until the host vehicle HV completes the lane change to the right by one lane from the original lane (for example, the first lane L1) to the first right adjacent lane (for example, the second lane L2).

Then, it is assumed that, after a predetermined time elapses, the host vehicle HV completes the lane change to the right by one lane from the original lane (for example, the first lane L1) to the first right adjacent lane (for example, the second lane L2). Immediately after the lane change is completed, the steering wheel cannot be turned sufficiently to the left. Therefore, normally the right turn signal 82 continues to blink. Accordingly, the CPU determines "Yes" in step 510 of FIG. 5 and proceeds to step 520. The CPU then determines "Yes" in step 520 and proceeds to step 550.

In step 550, the CPU determines whether the right margin distance DR is equal to or less than a predetermined threshold right margin distance DRth. For example, as shown in FIG. 6B, the right margin distance DR is a distance between the right side surface of the host vehicle HV and the left end (for example, the left end of the right lane marking R·L2 of the second lane L2) of the lane (that is, the first right adjacent lane) to which the lane change to the right by one lane from the original lane (for example, the first lane L1) is completed. The threshold right margin distance DRth is set to a value equal to the right margin distance DR when the host vehicle HV can be determined to sufficiently approach "the second right adjacent lane (for example, the third lane L3) that is a lane adjacent to the first right adjacent lane on the right side". For example, the threshold right margin distance DRth is set to a positive value smaller than the right margin distance DR when the host vehicle HV is traveling at the center of the lane of the normal motorway (for example, one-fifth to one-fourth of the lane width of the motorway). The determination condition in step 550 is also referred to as a "first condition" for convenience.

Immediately after the host vehicle HV completes the lane change to the right by one lane from the original lane (that is, the first lane L1) to the first right adjacent lane (that is, the second lane L2), as shown in FIG. 6B, the right margin distance DR is larger than the threshold right margin distance DRth. In this case, the CPU determines "No" in step 550 of FIG. 5 and proceeds to step 560.

In step 560, the CPU calculates a right margin time TTR based on the image information. The right margin time TTR is the time required for the right side surface of the host vehicle HV to reach the left end of the right lane marking of the first right adjacent lane (that is, the left lane marking of the second right adjacent lane). In the example shown in FIG. 6B, the right margin time TTR is a time when the host vehicle HV reaches the "left end of the right lane marking R·L2 of the second lane L2 (that is, the left end of a left lane marking L·L3 of the third lane L3). In other words, the right margin time TTR is the time until the host vehicle HV traveling in the first right adjacent lane starts to enter the second right adjacent lane.

More specifically, the CPU obtains the right margin time TTR by dividing the right margin distance DR by a right lateral speed Rspd (TTR=DR/Rspd). Then, in step 560, the CPU determines whether the right margin time TTR is equal to or less than a predetermined threshold time TRth. The determination condition in step 560 is also referred to as a "second condition" for convenience.

In general, when the driver of the host vehicle HV intends to change lanes to the right by one lane from the original lane, or intends to change lanes to the right by two or more lanes over a relatively long period of time, the lateral speed (right lateral speed Rspd) from the first right adjacent lane (for example, the second lane L2) toward the second right adjacent lane (for example, the third lane L3) adjacent to the first right adjacent lane on the right side is relatively small. That is, in this case, the right margin time TTR is longer than the threshold time TRth.

Therefore, when the right margin time TTR is longer than the threshold time TRth, the CPU determines "No" in step 560 of FIG. 5 and proceeds to step 570.

In step 570, as in step 420, the CPU determines whether the monitoring target object with respect to the right monitor range RA is present based on the right rear side object information.

When the monitoring target object with respect to the right monitor range RA is not present, the CPU determines "No" in step 570, proceeds directly to step 595, and temporarily terminates this routine.

On the other hand, when the monitoring target object with respect to the right monitor range RA is present, the CPU determines "Yes" in step 570, proceeds to step 580, and turns on the right mirror indicator 40 (maintains the lighting state). That is, in this case, the CPU does not generate the warning by blinking the right mirror indicator 40. After that, the CPU proceeds to step 595 and temporarily terminates this routine. Therefore, in this case, as shown in FIG. 6B, even when the right turn signal 82 is in a blinking state and the monitoring target object (another vehicle OVb) with respect to the right monitor range RA is present, the above warning is not generated.

Figure 7A:
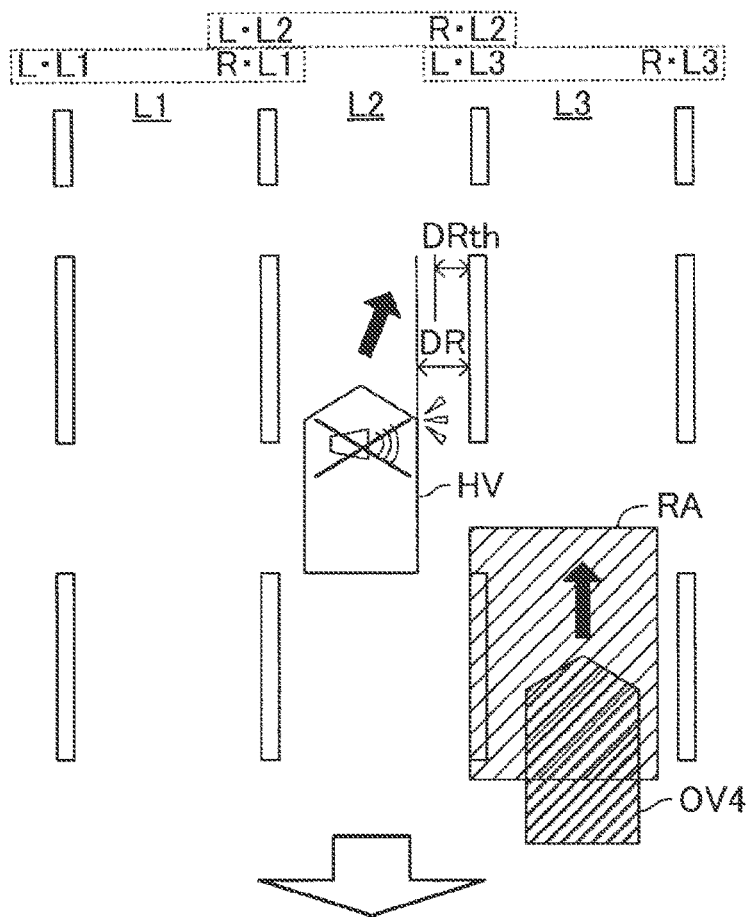
FIGS. 7A and 7B are plan views of the host vehicle and surroundings of the host vehicle showing a situation in which the host vehicle changes lanes.
Figure 7B:
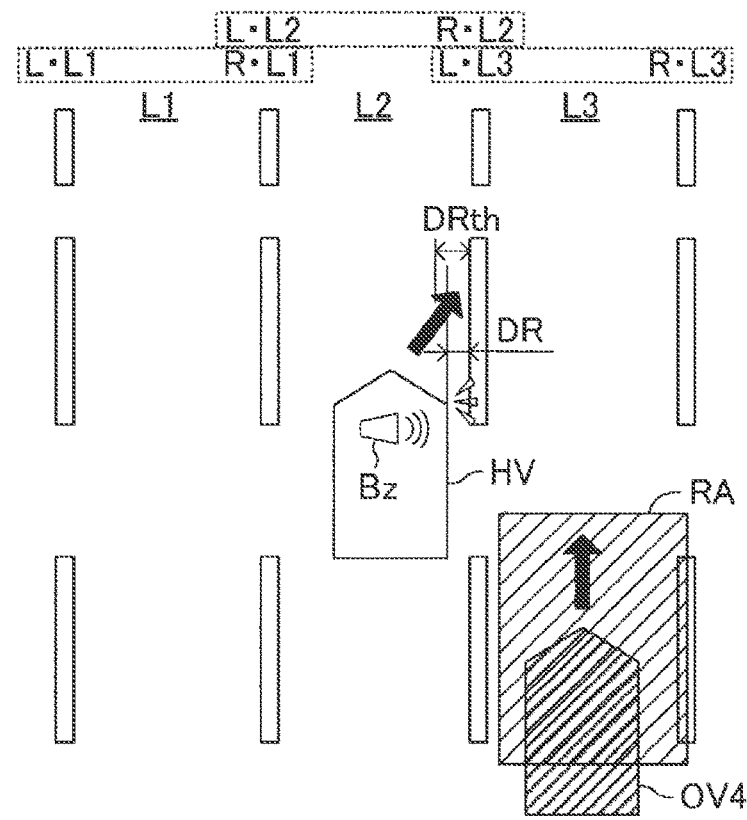

On the other hand, when the driver of the host vehicle HV intends to change lanes by two or more lanes from the original lane to the second right adjacent lane, the host vehicle HV gradually approaches the right lane marking of the first right adjacent lane (that is, the left lane marking of the second right adjacent lane) after the lane change by one lane. That is, for example, as in the example shown in FIG. 7A, when the driver of the host vehicle HV intends to change lanes from the first lane L1 to the third lane L3, the host vehicle HV gradually approaches the right lane marking R·L2 of the second lane L2 (the left lane marking L·L3 of the third lane L3). In this case, as shown in FIG. 7B, the right margin distance DR between the right side surface of the host vehicle HV and the left end of the right lane marking of the first right adjacent lane becomes equal to or less than the threshold right margin distance DRth.

In this case, when the CPU proceeds to step 550 shown in FIG. 5, the CPU determines "Yes" in step 550 and proceeds to step 530. As a result, when the monitoring target object with respect to the right monitor range RA is present, a warning by blinking the right mirror indicator 40, a warning by generating a warning sound from the buzzer 61, and a warning by vibrating the steering wheel using the steering vibration actuator 62 are performed (see step 540).

Furthermore, when the driver of the host vehicle HV intends to change lanes to the right by two or more lanes in a short period of time (for example, the driver intends to change lanes from the first lane L1 to the third lane L3 in a short time), the host vehicle HV approaches the right lane marking of the first right adjacent lane (for example, the right lane marking R·L2 of the second lane L2) in a short time after the lane change by one lane. In this case, the right margin time TTR becomes equal to or less than the threshold time TRth.

Figure 8A:
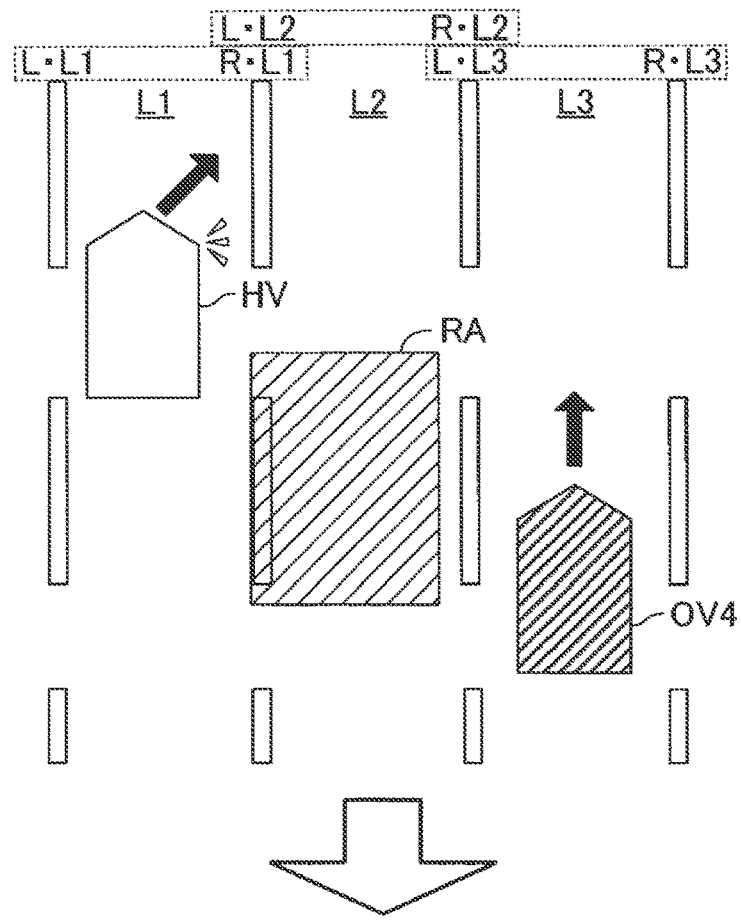
FIGS. 8A and 8B are plan views of the host vehicle and surroundings of the host vehicle showing a situation in which the host vehicle changes lanes.
Figure 8B:
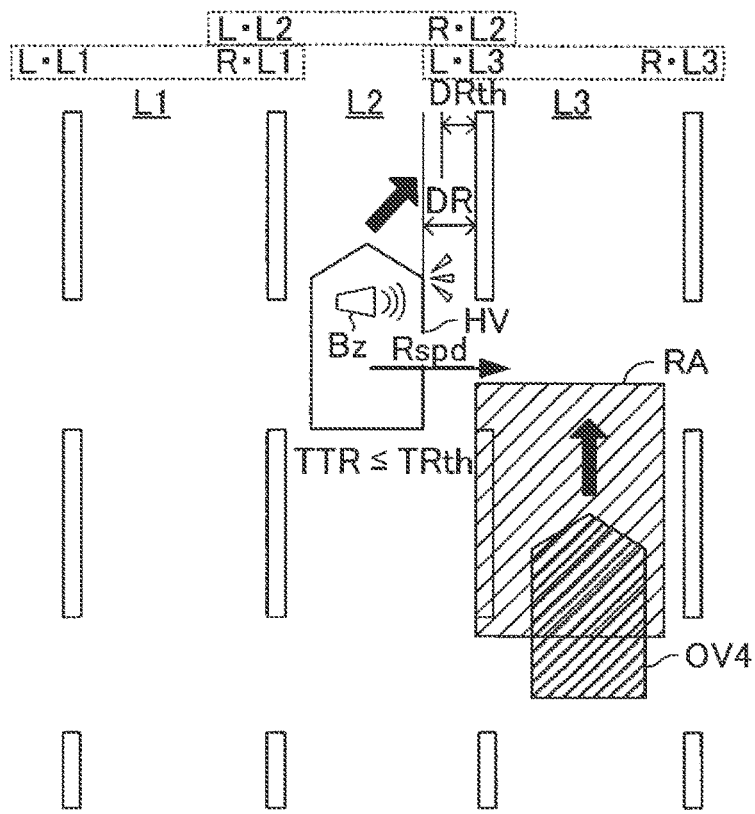

Therefore, in this case, as shown in FIG. 8B, even when the right margin distance DR in the first right adjacent lane is larger than the threshold right margin distance DRth (a determination is "No" in step 550), the CPU determines "Yes" in step 560 and proceeds to step 530. As a result, when the monitoring target object with respect to the right monitor range RA is present, the process in step 540 is executed. Therefore, the warning above is performed.

Note that, when the CPU determines "No" in step 530 and after the process in step 540 is executed, the CPU may determine whether the monitoring target object with respect to the left monitor range LA is present in the same manner as in step 440, and when such a monitoring target object is determined to be present, the left mirror indicator 20 may be lit. Note that, when the CPU determines "No" in step 570 and after the process in step 580 is executed, the CPU may determine whether the monitoring target object with respect to the left monitor range LA is present in the same manner as in step 440, and when such a monitoring target object is determined to be present, the left mirror indicator 20 may be lit.

BSM Control when Left Turn Signal is on

Figure 9:
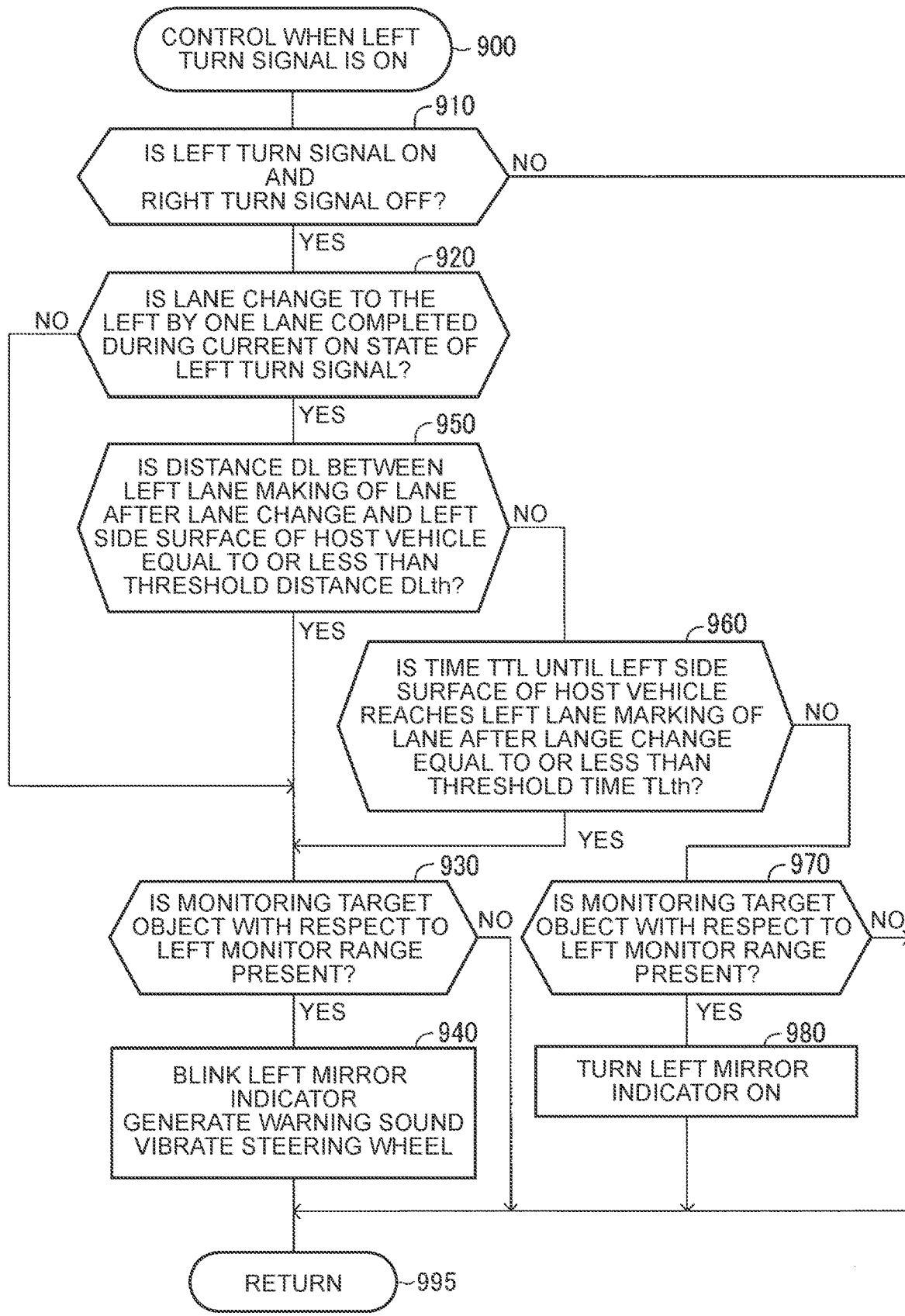
FIG. 9 is a flowchart showing the routine executed by the CPU of the left rear side ECU shown in FIG. 1.
Figure 10:
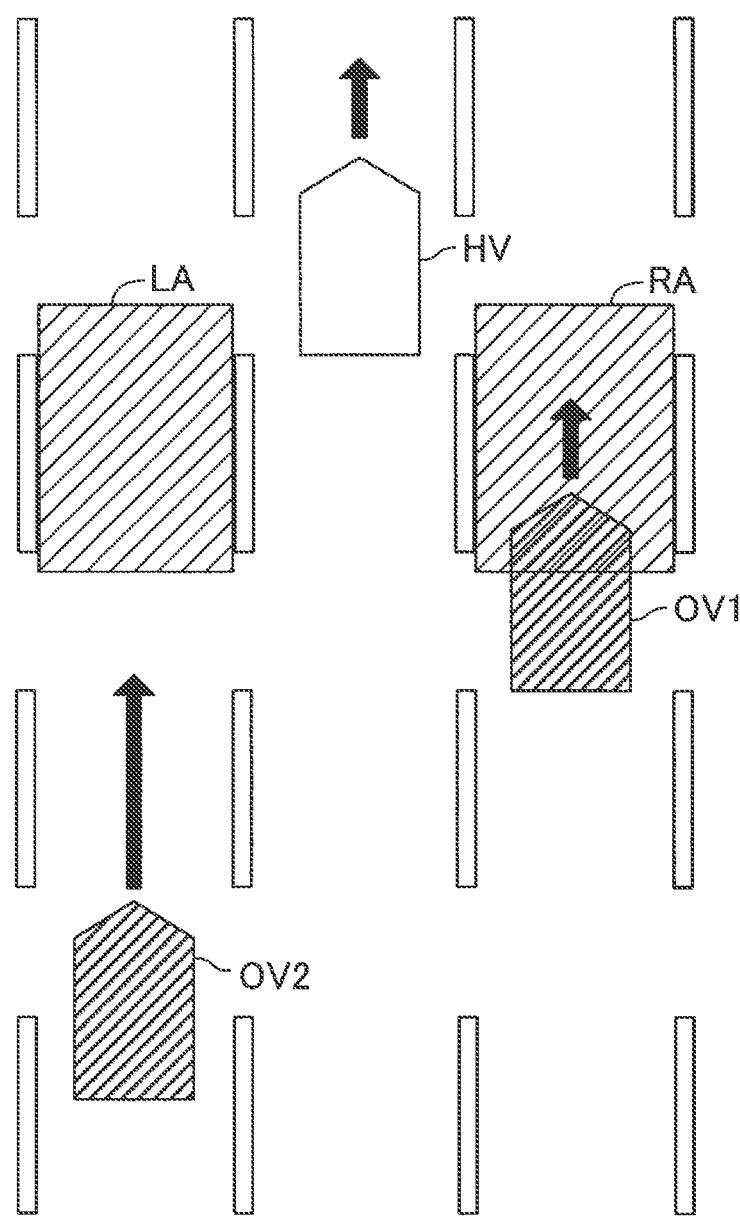
FIG. 10 is a plan view of the host vehicle and surroundings of the host vehicle showing the "right monitor range and left monitor range" of the host vehicle.
Figure 11:
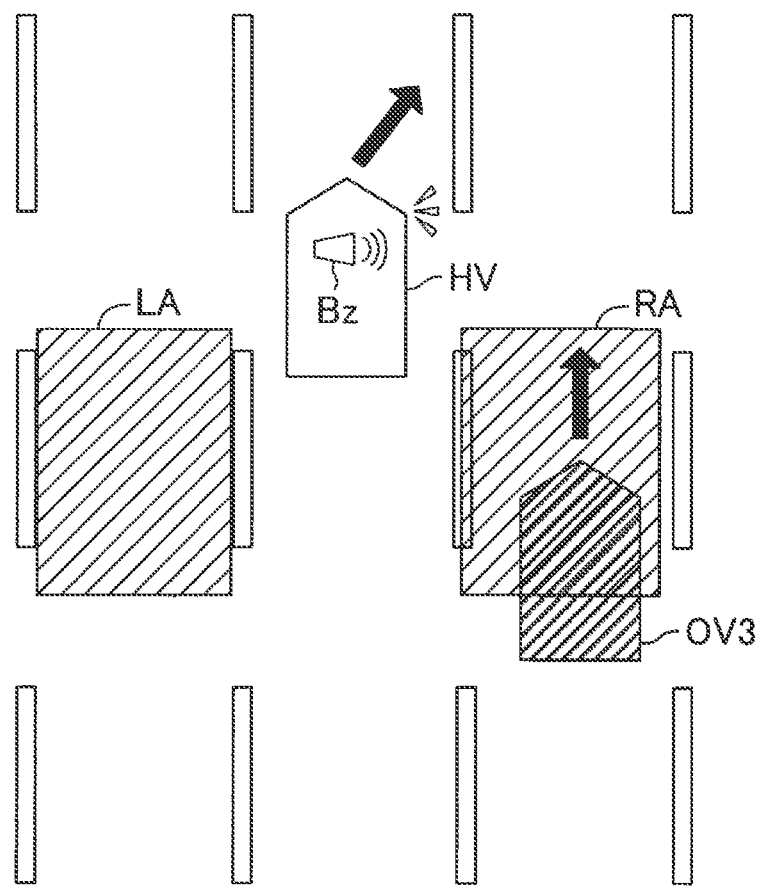
FIG. 11 is a plan view of the host vehicle and surroundings of the host vehicle showing the "right monitor range and left monitor range" of the host vehicle that starts to change lanes while a turn signal is blinking.
Figure 12A:
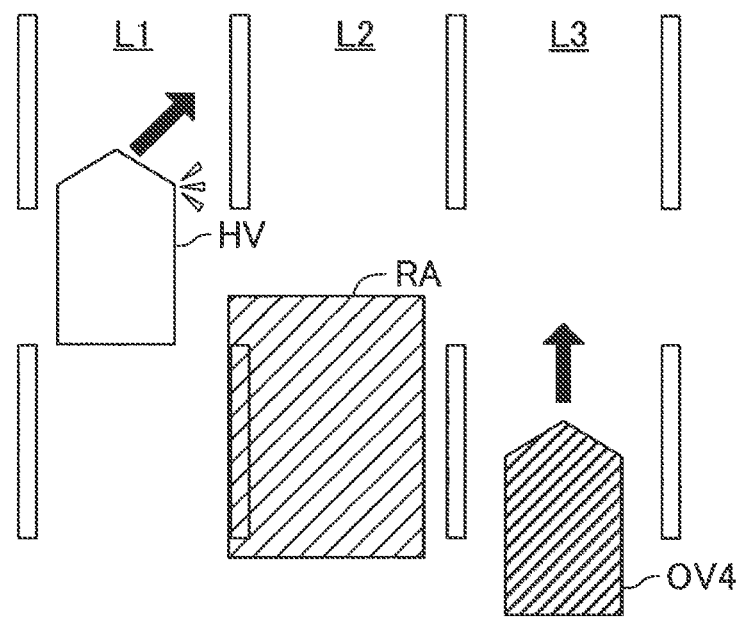
FIGS. 12A and 12B are plan views of the host vehicle and surroundings of the host vehicle showing a case where an unnecessary warning is generated to the host vehicle that is changing lanes while the turn signal is blinking.
Figure 12B:
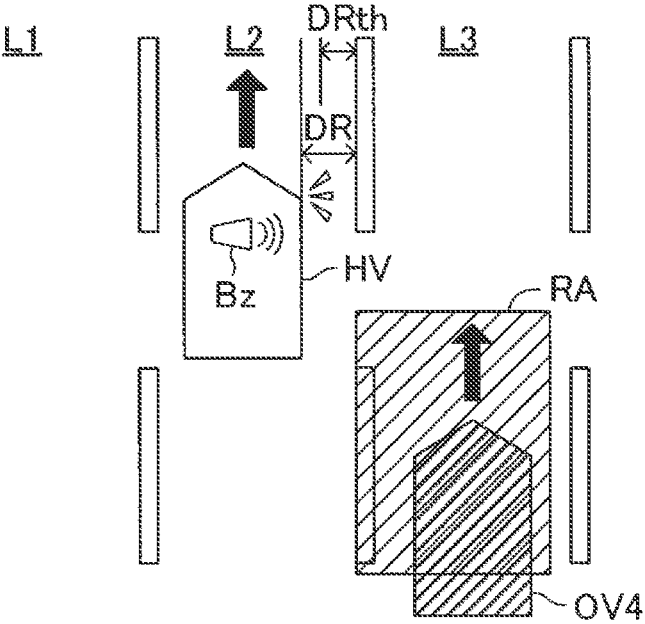

Therefore, when an appropriate time comes, the CPU starts processing from step 900 in FIG. 9 and proceeds to step 910, and determines whether the left turn signal 81 is on (that is, in the blinking state) and the right turn signal 82 is off (in the unlit state). More specifically, the CPU determines whether the CPU receives the high signal from the left turn signal switch 63 and the low signal from the right turn signal switch 64.

When the determination condition in step 910 is not satisfied, the CPU determines "No" in step 910, proceeds to step 995, and temporarily ends this routine.

On the other hand, when the determination condition in step 910 is satisfied, the CPU determines "Yes" in step 910 and proceeds to step 920. In step 920, the CPU determines that the host vehicle HV completes lane change by one lane from the original lane to a first left adjacent lane "while the left turn signal 81 is continuously maintained on after the left turn signal 81 is changed from off to on", based on the image information transmitted from the image ECU 52. The first left adjacent lane is a lane adjacent to the original lane in the left direction. "A period during which the left turn signal 81 is continuously maintained on after the left turn signal 81 is changed from off to on" is also referred to as a "specific period" in the left direction. The specific period in the left direction is the period during which the current on state (blinking state) of the left turn signal 81 is maintained.

When the left turn signal 81 is in the blinking state, the CPU determines that the lane change to the left is started when the left side surface of the host vehicle HV is aligned with the right end of the left lane marking of the original lane (for example, the left lane marking L·L3 of the third lane L3). When the left turn signal 81 is in the blinking state, the CPU determines that the lane change to the left by one lane is completed when the right side surface of the host vehicle HV is aligned with the right lane marking of the first left adjacent lane (for example, the right lane marking R·L2 of the second lane L2 that is adjacent to the third lane L3 on the left side) after the lane change to the left is determined to be started. Note that the right lane marking R·L2 of the second lane L2 is the same lane marking as the left lane marking L·L3 of the third lane L3.

When the host vehicle HV has not completed the lane change to the left by one lane, the CPU determines "No" in step 920 and proceeds to step 930. In step 930, the CPU determines whether the monitoring target object with respect to the left monitor range LA (that is, any of the first object and the second object) is present based on the left rear side object information.

When the monitoring target object with respect to the left monitor range LA is present, the CPU determines "Yes" in step 930 and proceeds to step 940 to generate a warning as described below.

The left mirror indicator 20 is set to the blinking state.
The buzzer 61 is caused to generate a warning sound.
The steering vibration actuator 62 is used to vibrate the steering wheel.

After that, the CPU proceeds to step 995 and temporarily terminates this routine.

On the other hand, when the monitoring target object with respect to the left monitor range LA is not present, the CPU determines "No" in step 930, proceeds directly to step 995, and temporarily terminates this routine.

Therefore, the warning is performed when the other vehicle that is the monitoring target object with respect to the left monitor range LA is present during a period after the left turn signal 81 changes to the blinking state until the host vehicle HV completes the lane change to the left by one lane from the original lane (for example, the third lane L3) to the first left adjacent lane (for example, the second lane L2).

After that, the host vehicle HV completes the lane change by one lane from the original lane (for example, the third lane L3) to the first left adjacent lane (for example, the second lane L2). The left turn signal 81 continues to blink immediately after the above. Therefore, the CPU determines "Yes" in step 910 and proceeds to step 920. The CPU then determines "Yes" in step 920 and proceeds to step 950.

In step 950, the CPU determines whether the left margin distance DL is equal to or less than a predetermined threshold left margin distance DLth. For example, the left margin distance DL is a distance between the left side surface of the host vehicle HV and the right end (for example, the right end of the left lane marking L. L2 of the second lane L2) of the lane (that is, the first left adjacent lane) to which the lane change to the left by one lane from the original lane (for example, the third lane L3) is completed. The threshold left margin distance DLth is set to a value equal to the left margin distance DL when the host vehicle HV can be determined to sufficiently approach "the second left adjacent lane (for example, the first lane L1) that is adjacent to the first left adjacent lane on the left side". The threshold left margin distance DLth is set to a value equal to the threshold right margin distance DRth, but may be set to a value different from the threshold right margin distance DRth. The determination condition in step 950 is also referred to as the "first condition" for convenience.

Immediately after the host vehicle HV completes the lane change to the left by one lane from the original lane (that is, the third lane L3) to the first left adjacent lane (that is, the second lane L2), the left margin distance DL is larger than the threshold left margin distance DLth. In this case, the CPU determines "No" in step 950 and proceeds to step 960.

In step 960, the CPU calculates a left margin time TTL based on the image information. The left margin time TTL is the time required for the left side surface of the host vehicle HV to reach the right end of the left lane marking of the first left adjacent lane (that is, the right lane marking of the second left adjacent lane). In other words, the left margin time TTL is the time until the host vehicle HV traveling in the first left adjacent lane starts to enter the second left adjacent lane.

More specifically, the CPU obtains the left margin time TTL by dividing the left margin distance DL by the left lateral speed Lspd (TTL=DL/Lspd). Then, in step 960, the CPU determines whether the left margin time TTL is equal to or less than a predetermined threshold time TLth. The threshold time TLth may be the same as or different from the threshold time TRth. The determination condition in step 960 is also referred to as the "second condition" for convenience.

In general, when the driver of the host vehicle HV intends to change lanes to the left by one lane from the original lane, or intends to change lanes to the left by two or more lanes over a relatively long period of time, the lateral speed (left lateral speed Lspd) from the first left adjacent lane (for example, the second lane L2) toward the second left adjacent lane (for example, the first lane L1) adjacent to the first left adjacent lane on the left side is relatively small. That is, in this case, the left margin time TTL is longer than the threshold time TLth.

Therefore, when the left margin time TTL is longer than the threshold time TLth, the CPU determines "No" in step 960 and proceeds to step 970.

In step 970, as in step 440, the CPU determines whether the monitoring target object with respect to the left monitor range LA is present based on the left rear side object information.

When the monitoring target object with respect to the left monitor range LA is not present, the CPU determines "No" in step 970, proceeds directly to step 995, and temporarily terminates this routine.

When the monitoring target object with respect to the left monitor range LA is present, the CPU determines "Yes" in step 970, proceeds to step 980, and turns on the left mirror indicator 20 (maintains the lighting state). That is, in this case, the CPU does not generate warning by blinking the left mirror indicator 20. After that, the CPU proceeds to step 995 and temporarily terminates this routine. Therefore, in this case, even when the left turn signal 81 is in the blinking state and the monitoring target object with respect to the left monitor range LA is present, the above warning is not generated.

On the other hand, when the driver of the host vehicle HV intends to change lanes by two lanes from the original lane to the second left adjacent lane (that is, for example, the driver intends to change lanes from the third lane L3 to the first lane L1), the left margin distance DL between the left side surface of the host vehicle HV and the right end of the left lane marking of the first left adjacent lane becomes equal to or less than the threshold left margin distance DLth.

Therefore, when the CPU proceeds to step 950, the CPU determines "Yes" in step 950 and proceeds to step 930. As a result, when the monitoring target object with respect to the left monitor range LA is present, a warning by blinking the left mirror indicator 20, a warning by generating a warning sound from the buzzer 61, and a warning by vibrating the steering wheel using the steering vibration actuator 62 are performed (see step 940).

Furthermore, when the driver of the host vehicle HV intends to change lanes to the left by two or more lanes in a short period of time (for example, the driver intends to change lanes from the third lane L3 to the first lane L1 in a short time), the host vehicle HV approaches the left lane marking of the first left adjacent lane (for example, the left lane marking L·L2 of the second lane L2) in a short time after the lane change by one lane. In this case, the left margin time TTL becomes equal to or less than the threshold time TLth.

Therefore, even when the left margin distance DL is larger than the threshold left margin distance DLth (a determination is "No" in step 950), the CPU determines "Yes" in step 960 and proceeds to step 930. As a result, when the monitoring target object with respect to the left monitor range LA is present, the process in step 940 is executed. Therefore, the warning above is performed.

Note that, when the CPU determines "No" in step 930 and after the process in step 940 is executed, the CPU may determine whether the monitoring target object with respect to the right monitor range RA is present in the same manner as in step 420, and when such a monitoring target object is determined to be present, the right mirror indicator 40 may be lit. Further, when the CPU determines "No" in step 970 and after the process in step 980 is executed, the CPU may determine whether the monitoring target object with respect to the right monitor range RA is present in the same manner as in step 420, and when such a monitoring target object is determined to be present, the right mirror indicator 40 may be lit.

In the above description, each of the lanes will be referred to as a first adjacent lane when it is not necessary to distinguish between the first right adjacent lane and the first left adjacent lane based on right and left directions.
Similarly, each of the lanes will be referred to as a second adjacent lane when it is not necessary to distinguish between the second right adjacent lane and the second left adjacent lane based on right and left directions.
When the traveling lane before the start of the lane change (that is, the original lane) is referred to as the first lane, the first adjacent lane is referred to as the second lane, and the second adjacent lane is referred as the third lane.

As described above, when the vehicle warning device 1 determines that the turn signal of the host vehicle HV in a specific direction that is any of the left direction and right direction is blinking based on the turn signal information, the vehicle warning device 1 determines that a warning target object with respect to a predetermined area behind the host vehicle HV in the specific direction (a range corresponding to the specific direction from the left monitor range LA and the right monitor range RA) is present based on the object information from a radar corresponding to the specific direction from the left rear side radar 11 and the right rear side radar 31, and when such a warning target object is determined to be present, a waning is generated using the warning generating device (at least one of the mirror indicator, the buzzer 61, and the steering vibration actuator 62).

Therefore, when the turn signal starts blinking, that is, when there is a high probability that the lane direction is changed from the original lane, a warning against the warning target object is generated, whereby the driver can more reliably recognize the warning target object.

On the other hand, after the lane change to the specific direction by one lane from the original lane is performed during the specific period, the warning against the warning target object is not generated until the probability that additional lane change by one lane is performed becomes high (that is, at least one of the first condition and the second condition is satisfied). Therefore, it is possible to reduce the possibility that the warning that annoys the driver is generated.

Modification

In the above embodiment, the threshold time TRth is a constant value. However, the threshold time TRth may be changed based on the lane width such that the threshold time TRth becomes shorter as the lane width of the road on which the host vehicle HV is traveling becomes narrower (shorter). Similarly, in the above embodiment, the threshold time TLth is a constant value. However, the threshold time TLth may be changed based on the lane width such that the threshold time TLth becomes shorter as the lane width of the road on which the host vehicle HV is traveling becomes narrower (shorter). Note that the CPU may acquire the lane width of the lane in which the host vehicle HV is traveling based on the image data, and may acquire information on the lane width of the road corresponding to the position at which the host vehicle HV is currently traveling based on the current position of the host vehicle HV detected by a navigation system (not shown) and road information stored in a storage device of the navigation system or obtained via communication. However, it is preferable that the threshold right margin distance DRth and the threshold left margin distance DLth be constant values even when the lane width changes.

The present disclosure is not limited to the above embodiment and modification, and various modifications can be adopted within the scope of the present disclosure.

For example, when the lane change by one lane is completed after the turn signal in the specific direction is turned on, the conditions for permitting execution of the warning (warning permission condition) includes the first condition (the determination condition in step 550 and the determination condition in step 950) and the second condition (the determination condition in step 560 and the determination condition in step 960). However, the warning permission condition may be only the first condition or only the second condition. Further, the warning permission condition may include a condition different from the first condition and the second condition.

Instead of or in addition to the left side mirror indicator 20 in the above embodiment, an indicator may be provided in a vehicle cabin to indicate that the warning target object is present on the left rear side. Lighting or blinking of this indicator corresponds to the warning by the vehicle warning device. For example, such an indicator may be provided in a head-up display and/or a meter display. Similarly, instead of or in addition to the right side mirror indicator 40 in the above embodiment, an indicator may be provided in the vehicle cabin to indicate that the warning target object is present on the right rear side. For example, such an indicator may be provided in a head-up display and/or a meter display.

In the above embodiment, the buzzer 61 may be two of a leftward buzzer that generates a warning sound from the left side of the driver and a rightward buzzer that generates a warning sound from the right side of the driver. In this case, it is preferable that a warning sound be generated from the rightward buzzer in step 540 and a warning sound be generated from the leftward buzzer in step 940.

The warning target object may be any of the first object and the second object, and may include an object other than the first object and the second object in addition to the first object and the second object. That is, for example, the warning target object may include a motorcycle.

In the above embodiment, the buzzer 61 may be omitted. Similarly, in the above embodiment, the steering vibration actuator 62 may be omitted. In addition, the warning generating device other than the buzzer 61 and the steering vibration actuator 62 (for example, a vibrating device for the driver's seat) may be provided.

In the above embodiment, turn signal information may be obtained from the turn signal control circuit 80. Further, the warning executing ECU 60 may implement the function of the turn signal control circuit.

In the above embodiment, the object information on the object present within the detection range LDar and the detection range RDar may be acquired by a monitoring sensor other than the left rear side radar 11 (for example, light detection and ranging: LIDAR). LIDAR is a sensor that detects the object information using light instead of radio waves.

The left margin distance DL and the right margin distance DR may be calculated from the median deviation distance, the lane width, and the vehicle width of the host vehicle HV. In other words, each of the first condition and the second condition may be determined based on the median deviation distance, the lane width and the host vehicle HV.

What is claimed is:

1. A vehicle warning device comprising:
   a sensor configured to acquire information of an object laterally at a rear of a vehicle;
   a camera that captures an area in front of the vehicle and generates image data of the area in front of the vehicle;
   a warning generating device configured to be able to generate a warning to a driver of the vehicle; and
   a control unit that causes the warning generating device to generate the warning when the control unit determines that a warning target object is present in a case where the control unit acquires turn signal information that is information on an operating state of a turn signal in a left direction of the vehicle and a turn signal in a right direction of the vehicle and determines that the turn signal in a specific direction being any one of the left direction and the right direction is blinking based on the turn signal information, the warning target object including at least one of a first object that is positioned in a predetermined area behind the vehicle in the specific direction and a second object that is predicted to enter the predetermined area within a predetermined time, wherein when the control unit determines that a specific state occurs based on the turn signal information and the image data, the specific state being a state in which blinking of the turn signal in the specific direction continues after the vehicle completes a lane change by one lane from a first lane to a second lane adjacent to the first lane in the specific direction while the turn signal in the specific direction is blinking, the control unit is configured to determine whether a warning permission condition including at least one of a first condition satisfied when a distance between a lane marking that separates a third lane adjacent to the second lane in the specific direction from the second lane and a side surface of the vehicle in the specific direction is equal to or less than a threshold distance and a second condition satisfied when a time until the side surface of the vehicle in the specific direction starts to enter the third lane is equal to or less than a threshold time is satisfied based on the image data, and is configured not to cause the warning generating device to generate the warning when the warning permission condition is determined not to be satisfied even though the warning target object is determined to be present.

2. The vehicle warning device according to claim 1, wherein the control unit is configured to
   determine whether the first condition is satisfied when the control unit determines that the specific state occurs, and
   determine that the warning permission condition is not satisfied when the control unit determines that the first condition is not satisfied.

3. The vehicle warning device according to claim 2, wherein the control unit is configured to
   determine whether the second condition is satisfied when the control unit determines that the specific state occurs,
   determine that the warning permission condition is satisfied when the control unit determines that the second condition is satisfied even though the control unit determines that the first condition is not satisfied, and
   cause the warning generating device to generate the warning when the control unit determines that the warning target object is present in a case where the control unit determines that the warning permission condition is satisfied.

4. The vehicle warning device according to claim 1, wherein the control unit is configured to
   acquire a lane width of a road on which the vehicle is traveling, and
   change the threshold time such that the threshold time becomes shorter as the lane width becomes narrower.

5. The vehicle warning device according to claim 1, wherein:
   the warning generating device includes a sound generating device that is able to generate a warning sound; and
   the control unit is configured to generate the warning by causing the sound generating device to generate the warning sound.

6. The vehicle warning device according to claim 1, wherein:
   the warning generating device includes a steering vibration actuator that is able to vibrate a steering wheel of the vehicle; and
   the control unit is configured to generate the warning by vibrating the steering wheel using the steering vibration actuator.

7. The vehicle warning device according to claim 1, wherein:
   the warning generating device includes an indicator installed in a side mirror of the vehicle; and
   the control unit is configured to generate the warning by blinking the indicator.

* * * * *